No. 866,826. PATENTED SEPT. 24, 1907.
W. SWARD.
END GATE FOR WAGONS.
APPLICATION FILED APR. 2, 1907.
2 SHEETS—SHEET 1.
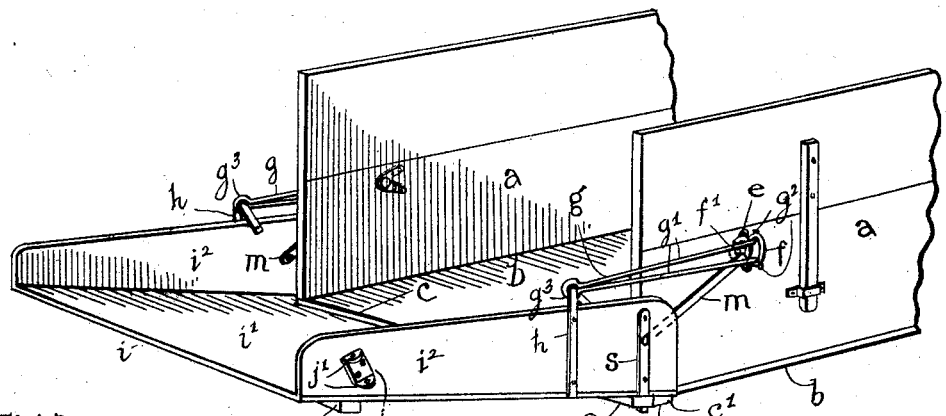
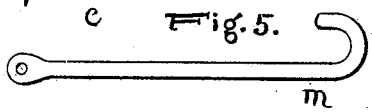
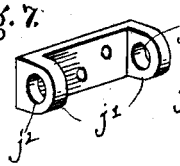
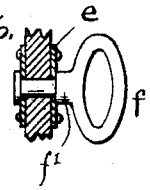
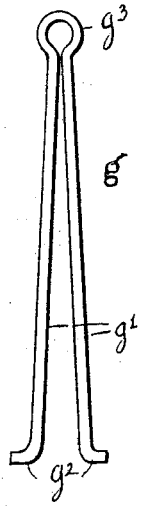
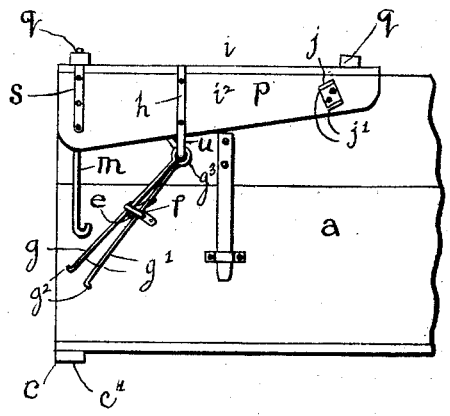
Inventor
William Sward
By E. W. Anderson
his Attorney
Witnesses
Stuart Hilder.
George M. Anderson.

No. 866,826. PATENTED SEPT. 24, 1907.
W. SWARD.
END GATE FOR WAGONS.
APPLICATION FILED APR. 2, 1907.
2 SHEETS—SHEET 2.
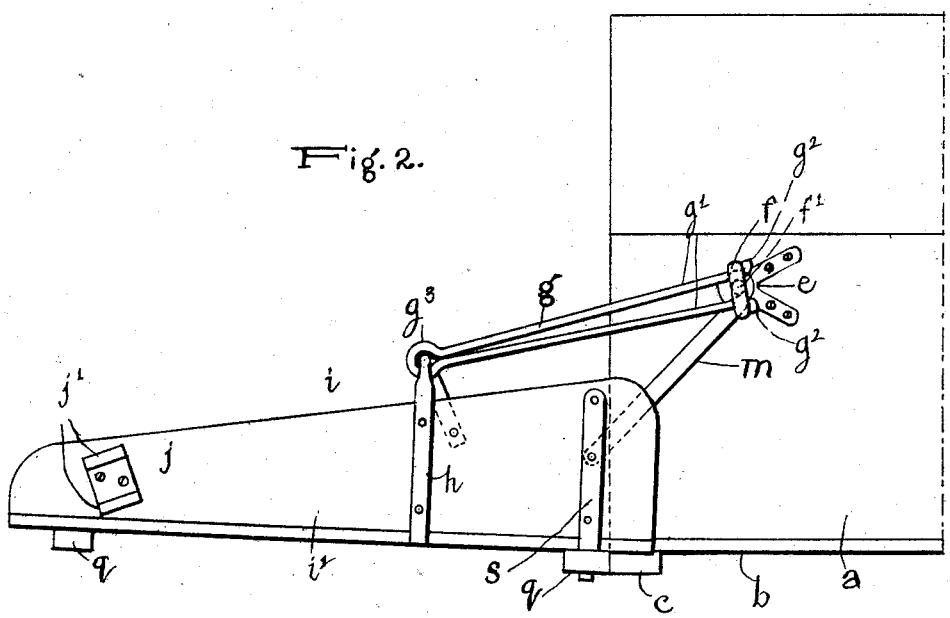
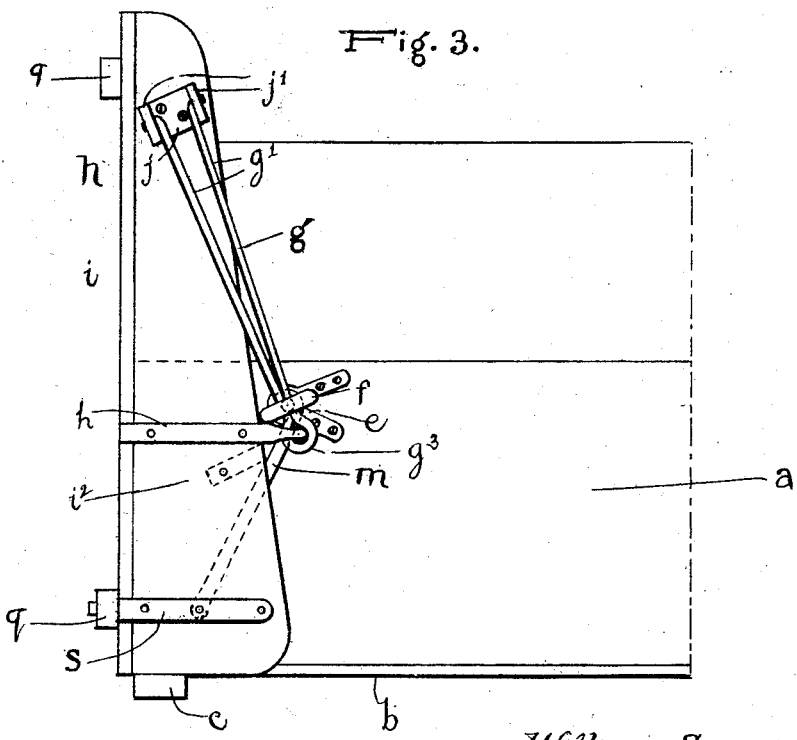
Witnesses
Stuart Hilder.
George M. Anderson.
Inventor
William Sward
By E. W. Anderson
his Attorney

UNITED STATES PATENT OFFICE.

WILLIAM SWARD, OF MEDIAPOLIS, IOWA.

END-GATE FOR WAGONS.

No. 866,826.   Specification of Letters Patent.   Patented Sept. 24, 1907.

Application filed April 2, 1907. Serial No. 365,993.

*To all whom it may concern:*

Be it known that I, WILLIAM SWARD, a citizen of the United States, and a resident of Mediapolis, in the county of Des Moines and State of Iowa, have made a certain new and useful Invention in End-Gates for Wagons; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied, the end gate being shown in lowered position; Fig. 2 is a side view of the invention as applied, with the end gate in lowered position; Fig. 3 is a similar view, the end gate being shown as in closed position; Fig. 4 is a similar view on a smaller scale, the end gate being shown as raised and resting on the side pieces of the wagon body; Fig. 5 is a detail view of one of the hook arms; Fig. 6 is a detail sectional view showing the rotary bearings of the loop form stop device; Fig. 7 is a detail view of one of the catch plates, and Fig. 8 is a detail view of one of the link devices.

The invention relates to end gates for wagon boxes, and it consists in the novel construction and combination of parts, as hereinafter set forth.

In the accompanying drawings, illustrating the invention, the letter $a$ designates the side walls or boards of a wagon box, and $b$, the bottom thereof, having a transverse bar $c$, secured to its lower surface at the rear end.

Each side wall of the wagon box or body is provided with a loop form stop and support $f$, having a stem $f'$, provided with rotary bearings in a plate or casting $e$, secured to such side wall, this stop and support being when the end gate is lowered as shown in Figs. 1 and 2 of the drawings, engaged by the outward bent ends $g^2$, of spring branches $g'$, of a link device $g$, between end gate and wagon body, the other end of such device $g$, having an eye or loop $g^3$, provided with a pivotal connection with a strap $h$, secured to a side piece or flange of the end gate. The end gate is shown at $i$, and consists of a transverse main portion $i'$, and side pieces or flanges $i^2$, to which the straps $h$, are secured. The main or body portion of this end gate is made somewhat wider than the wagon box, so that the flanges $i^2$, will lie outside the side pieces of the wagon box, when the end gate is closed. Strong transverse cleats $q$, are secured to the upper and lower portions of the end gate. Each side piece or flange of the end gate is provided near its upper end with a catch plate $j$, having an outstanding flange $j'$, at each side, provided with perforations $j^2$. A hook arm $m$, is pivoted to each side piece of the end gate, being usually connected to a securing bolt passing through a strap $s$, located at the lower portion of the end gate at each side.

When the end gate is in lowered position, it is supported by the link device $g$ at each side, (which in this case has stop engagement by its outward bent ends, with the loop device $f$), in connection with the abutment of the cleat $q$, at the lower portion of the end gate against the cleat $c$, of the wagon body. The pivoted hook arms $m$, of the end gate through their detachable engagement with the stem of the loop devices, act as an additional support for the end gate in this position thereof.

When the end gate is in raised position, closing the end of the wagon box, as shown in Fig. 3 of the drawings, it is held in such position by the link device $g$, which has the outward bent ends of its spring branches in engagement with the perforations of the flanges of the bracket or catch plate $j$, the opposite end portion of such link device having stop engagement with the loop device $f$. The hook arms $m$, of the end gate in this position thereof act as an additional support to maintain such gate in position, by engagement with the stems of the loop devices $f$. The hook arm in this case extends downward from the loop device, the link device $g$, extending upward therefrom, each acting as a check upon the other to relieve it of strain. The spring branches of the link device $g$, closely approach each other at the end having the eye or loop $g^3$, whereby such eye or loop is prevented from becoming disengaged from the strap $h$, of the end gate. The outward turned ends of the link device may be sprung inward from engagement with the perforations of the catch plate $j$, or from the loop device $f$.

In Fig. 4 of the drawings is shown a third position of the end gate wherein it rests upon the tops of the side pieces of the wagon body. In this case, the hook arms $m$, hang loosely downward, the spring branches $g'$, of the link devices passing loosely through the loop devices $f$, at the sides.

When the end gate is in lowered position, the bottom or lower end thereof laps over the laterally projecting ends $c'$, of the transverse cleat or bar $c$, of the wagon body, and is to some extent supported thereby. When the end gate is raised to close the rear end of the wagon body, the side pieces thereof rest upon such laterally projecting ends $c'$, of the bar $c$.

Having thus described my invention, what I claim as new, and desire to secure by Letters Patent is:—

1. An end gate for wagon bodies having side flanges, and means of connection and support between end gate and wagon body, including a stop device having a stem portion provided with rotary bearings in the side wall of the wagon body, and a link device having a pivotal engagement at one end thereof with a side flange of the end gate, and an out-turned free end portion capable of stop engagement with said stop device, a side flange of the end gate having at the upper end portion thereof a catch device capable of detachable engagement with the out-turned free end portion of said link device.

2. An end gate for wagon bodies, having side flanges, and means of connection between end gate and wagon body, consisting in a loop form stop device at each side having a stem portion provided with rotary bearings in the side wall of the wagon body, a link device at each side having spring branches provided with an eye at one end having pivotal connection with a side flange of the end gate, said branches having out-turned free end portions capable of stop engagement with one of the loop devices, a hook arm at each side pivoted to the end gate at one end portion thereof and capable of engagement at the other end portion thereof with the stem of one of the stop devices, said side flanges of the end gate having each at the upper end portion thereof a catch plate adapted for detachable engagement with the out-turned ends of one of the link devices.

3. An end gate for wagon bodies having side flanges, and means of connection and support between end gate and wagon body, consisting in a loop form stop device at each side having a stem portion provided with rotary bearings in the side wall of the wagon body, a link device at each side having spring branches provided with an eye at one end having pivotal connection with a side flange of the end gate, said branches having out-turned free end portions capable of stop engagement with one of the loop devices, the side flanges of the end gate having each at the upper end portion thereof a catch device adapted for detachable engagement with the out-turned ends of one of the link devices.

In testimony whereof I affix my signature, in presence of two witnesses.

WILLIAM SWARD.

Witnesses:
H. F. KUHLEMEIER,
C. H. MOHLAND.